Patented Nov. 28, 1944

2,363,666

UNITED STATES PATENT OFFICE 2,363,666

STEELMAKING

John E. Greenawalt, Bronxville, N. Y.

No Drawing. Application April 15, 1942,
Serial No. 439,081

10 Claims. (Cl. 75—54)

The invention relates to steel making procedure, and, in one of its more particular aspects, to an ore charge for use in furnaces for the decarburization or refining of steel, and a method of preparing such charge. The invention is especially adapted to preparation and working of the bath in the production of steel in open hearth furnaces, electric furnaces, or the like.

In the production of steel in the open hearth furnace as conducted at present, large quantities of steel scrap and some cast iron scrap are used with molten or pig iron. Iron ore is charged into the furnace at the beginning of the operation and again toward the end of the process for the purpose of oxidizing the carbon of the iron to the extent required to give the proper carbon analysis for the type of steel to be produced. The ore which is introduced at the beginning of the operation is frequently referred to as the "furnace charge," and the ore which is added toward the end of the process is frequently referred to as the "work charge" or "feed ore." In the specification and claims of this application, the term "ore charge" is used generically, and will be understood to refer either to the furnace charge, or the work charge, or both. Where any distinction is intended to be drawn between the furnace charge and the work charge, these specific terms will be used, and no limitation in this respect is to be implied from the use of the term "ore charge," which is used without reference to the time or manner of charging the furnace.

A generally accepted method of charging the open hearth is, first, to cover the hearth of the furnace with limestone, and place upon it the furnace charge ore, the size of this charge depending upon the amount of molten or pig iron to be added. The scrap steel is placed upon the furnace charge ore, the charge heated, and then the iron is added, usually in molten form. The proper heating of the charge at the time of addition of the iron is important, for if the iron is added before the temperature is sufficiently high, the iron is chilled, whereas on the other hand, if the iron is added too late, the higher temperature of the bath sets up reactions which become so violent as to cause operating difficulties. The final refining of the steel bath is accomplished by adding the proper amount of work charge ore, which must be introduced in pieces of sufficient size and density to sink through the molten slag and make positive contact with the molten steel bath. The amount of furnace charge ore, i. e., the ore charged into the furnace at the beginning of the operation, is always less than the total amount of ore necessary for the reduction of the carbon of the metal bath to the correct amount required to meet the specifications of the steel being manufactured. Toward the end of the process, the steel bath is tested for carbon, and then the necessary amount of work charge ore is added to reduce the carbon to the exact amount required. Only ores having certain characteristics are suitable for the work charge. These characteristics are that the ore must be in lump form and also of sufficient density to settle through the slag to make contact with the steel bath beneath. Ores suitable for this purpose are becoming scarce, and it is an object of my invention to provide a method of preparing a good work charge from ores of a character which heretofore have not been considered useful for this purpose.

Another object of my invention is to provide a method of preparing an ore charge which, upon the introduction of molten or pig iron to the bath, produces less violent reactions than charges heretofore known or used.

The ore for the furnace charge does not need to be of the same density and lump size as required for the work charge, but it is desirable to have heavy material in lump form which is free from fines. Accordingly, it is a further object of the invention to provide a processed ore charge which has improved characteristics both for use as a furnace charge, and as a work charge.

A further object is to provide a method of preparing ore charge in which the iron oxide of the ore is principally in the ferrous form, since the ferrous form of oxide yields approximately one-third more iron than the ferric oxide per unit weight.

In addition to the reduction of ferrous oxide to free metallic iron, there are other essential reactions typical of the basic open hearth process, in particular, the conversion of large quantities of iron silicates and phosphates into their corresponding calcium salts requisite for the elimination of the impurities in the iron. Considerable time is required to bring about these reactions by reason of the method of charging the materials into the furnace. As pointed out above, the limestone is charged onto the hearth of the furnace, and then the furnace charge ore is placed on top of the limestone. With this arrangement of materials, much time and fuel is consumed before the limestone can be brought into intimate contact with the silicon and iron oxides of the ore to enable these reactions to take place. The difficultly fusible character of the limestone and ferric oxide contribute further to the problem of bringing the constituents into reacting contact. Accordingly, it is another object of this invention to mix the lime with the ore, and bring about some of the above-mentioned reactions before the charge is placed in the furnace and, further, to form easily fusible compounds.

A further important object of the invention is to provide a method of making open hearth steel in which the silica and phosphorus of the ore charge are converted into their calcium compounds before they are charged into the furnace, and thereby prevent the formation of large quantities of iron silicates and phosphates, as normally occurs in melting down the charge in accordance with present day methods.

Although in many cases it is desired to use a high percentage of iron in the open hearth charge, to do so is likely to cause serious operating difficulties because of the violent frothing of the charge occurring by reason of the rapid formation of basic slag, and the oxidation of the phosphorus and silicon with rapid evolution of CO and $CO_2$ from the limestone, and of the extra atom of oxygen from the ferric oxide. It is a further object of my invention to provide an improved ore charge and method which will substantially eliminate, or greatly reduce, the violence of this reaction.

In accordance with my invention, certain preliminary reactions are brought about outside of the furnace by sintering the ore with another material or materials to form an agglomerate in which the iron oxide is principally in the ferrous form, and in which the silica and phosphorus of the ore charge preferably are converted into their calcium compounds, $CaSiO_2$ and $Ca(PO_4)_2$. Thereafter the converted ore charge is reacted with free ferrous metal in the open hearth. In the preliminary sintering process, the ore is combined with limestone or ferrous metal chips, borings or turnings, or with both limestone and ferrous metal chips, etc. In the case of furnace charge ore, limestone is used and in the case of work charge ore, ferrous metal chips, borings or turnings are used. Limestone may also be used along with the ferrous metal chips, borings or turnings in preparing the work charge ore, and, conversely, the ferrous metal chips, borings or turnings may be used along with limestone in preparing the furnace charge ore. Speaking of the ore charge in general (that is, without particular reference to whether it is to be used as a furnace charge or a work charge) I prefer to use both limestone and ferrous metal chips, borings or turnings in the sintering process. As represented by this preferred method, two of the important features of the invention comprise the conversion of the silica and phosphorus of the ore into calcium silicates and phosphates and the conversion of the iron oxide of the ore principally into the ferrous form, the reactions incident to these conversions being performed prior to introduction of the charge into the open hearth. The advantages of these steps and of the improved ore charge so produced will be apparent partly from the preceding statement of objects of the invention, and partly from the description which follows.

In order that the invention will be more fully understood, I shall now describe certain preferred embodiments thereof. First, let us take as a specific example the preparation of an ore which is intended primarily for use as a furnace charge:

From 75 to 80 percent of an ore analyzing approximately

| | Percent |
|---|---|
| Fe | 57.20 |
| $SiO_2$ | 6.52 |
| CaO | .31 | is combined with from 25 to 20 percent of limestone, suitably mixed with a small amount of fuel, preferably in the form of fine coke or anthracite culm, and this mixture is subjected to the down draft sintering process at a temperature of the sintering zone of between 2400° and 2600° Fahrenheit, whereby the charge is formed into an agglomerate having approximately the following analysis:

| | Per cent |
|---|---|
| Fe | 52.10 |
| $SiO_2$* | 7.22 |
| CaO* | 12.31 |
| C | 0.85 |
| FeO | 43.20 |

* Principally in the form of calcium silicates.

The charge so produced is placed on the hearth of the furnace, and upon this charge is placed the scrap steel. The charge is then heated in a furnace temperature of approximately 2900° Fahrenheit, and molten pig iron added. I have found that with this procedure, the violence of the ensuing reactions is greatly reduced, simplifying the operating technique and making it unnecessary to control the temperature of the bath at the times of addition of the iron so closely as is necessary in the ordinary open hearth process. I have also found that there is an important saving in the amount of fuel required for the refining operation, and in the time required for this operation.

Although the ore for the furnace charge does not need to be of the same density as is desirable for the work charge, it is advantageous to incorporate steel chips, borings or turnings of iron or steel, or of both, in the sinter. Inasmuch as the density of the charge is of the greatest importance, I shall now describe this aspect of my invention with more particular reference to the preparation of a work charge. For example, 80 percent by weight of an ore charge analyzing

| | Per cent |
|---|---|
| Fe | 57.20 |
| $SiO_2$ | 6.52 |
| $CaO_3$ | 8.31 | is suitably mixed with 20 percent by weight of cast iron borings analyzing

| | Per cent |
|---|---|
| Fe | 94.22 |
| C | 3.35 |
| $SiO_2$ | 1.52 |
| S | .12 | together with a small amount of fuel, which may be in the form of fine coke or anthracite culm, and this mixture is subjected to the down draft sintering process at a temperature of the sintering zone of between 2400° and 2600° Fahrenheit, whereby the charge is formed into an agglomerate having approximately the following analysis:

| | Per cent |
|---|---|
| Fe* | 67.70 |
| $SiO_2$ | 7.00 |
| S | .06 |
| CaO | 4.00 |
| C | .86 |

* Of which 56.90% is present in the form of FeO.

The charge so produced is used in the manner of an ordinary work charge, but has the advantage of being of greater density and always being available in lumps of such a size as to insure that the ore will quickly settle through the slag of the bath for direct contact with the molten metal.

As a further example of my invention, 65 percent by weight of an ore in its natural state, the principal ingredients of which analyzed approximately

| | Per cent |
|---|---|
| Fe | 54.58 |
| SiO₂ | 7.20 |
| CaO | .44 |
| Moisture | 8.32 | was combined with 15 percent of limestone, suitably mixed with 20 percent by weight of cast iron borings analyzing

| | Per cent |
|---|---|
| Fe | 92.4 |
| C | 3.45 |
| Si | 2.10 |
| Mn | .85 |
| P | .18 |
| S | .09 |
| Cr | .45 | together with 8.7 percent of fuel, in the form of fine coke, and this mixture was subjected to the down draft sintering process at a temperature of the sintering zone of between 2400° and 2600° Fahrenheit, whereby the charge was formed into an agglomerate having the following analysis:

| | Per cent |
|---|---|
| Fe* | 64.70 |
| SiO₂† | 7.00 |
| CaO† | 8.25 |
| C | .86 |
| S | .04 |

\* Of which 49.90% is present in the form of FeO.
† Principally in the form of calcium silicates.

The manner of employing the charge so produced will be understood from the description of the preceding examples.

The sintering step which I have described may be performed with apparatus of any suitable type, and since such apparatus is well known in the art, it need not be described here. For example, the ore, fuel, limestone and turnings or borings may be placed upon a grate having an air-tight chamber beneath it, with means for creating a partial vacuum in this chamber to produce a strong flow of air down through the material. After ignition of the top surface of the material, this air current brings the charge by internal combustion to a high temperature, causing incipient fusion. The character of the resulting agglomerate depends upon the charge being sintered, the amount of fuel added, and the strength of the draft. For the preparation of the product contemplated by this invention, I use more fuel than is used in the ordinary sintering charge, thus bringing about a higher temperature and causing a greater slagging, smelting and reducing action within the charge. The agglomerate produced is characterized by great density, and the high content of free metal gives it the necessary weight for efficient results in the open hearth process.

The metal chips, borings and turnings may conveniently be in the form of waste resulting from machine shop operations, and may be of cast iron or steel, or of a mixture of iron and steel. In the case of long steel turnings, it is preferable to pass these through a shredding machine to reduce the length of each piece to about four inches or less.

The amount of borings and turnings added to the ore charge before sintering depends upon whether the charge is to be used as a refining agent or work charge toward the end of the open hearth process, or whether it is to be used in the furnace charge. While density and weight are desirable in the furnace charge, these qualities are not so vital as when the product is to be used as a refining agent. For refining, the charge preferably should have 30 percent or more of borings or turnings, while for the furnace charge, 10 to 15 percent would give satisfactory results.

Enough limestone must be used to flux the silica of the ore as well as the silicon of the pig iron. This rarely is more than 20 percent of the weight of ore added and I have demonstrated that an excellent agglomerate can be made with a mixture of 80 percent ore and as much as 20 percent limestone, plus the necessary amount of fuel, the proportions of the named ingredients being adjusted to form a product comprising from about 30 to 60 percent of ferrous oxide, and from about 5 to 15 percent of calcium silicate—also, preferably, from about 5 to 15 percent of free iron. The resulting agglomerate produces a basic slag having all the necessary ingredients for the rapid oxidation of the phosphorus, silicon, manganese and carbon. Furthermore, in the sintering operation, all of $CO_2$ gas of the lime has been driven off, and some of the oxygen of the ore has been eliminated in reducing the ferric oxide to the lower oxides so that when this product comes into contact with the hot molten pig iron, the violent effervescence usually occurring when hot molten iron is brought into contact with hot ore is greatly reduced.

It will be understood from the preceding description that I have provided means for increasing the efficiency of the refining operation both from the standpoint of decreasing the length of time required for this operation, and decreasing the amount of fuel required. Moreover, the reactions in the open hearth are less violent, thus minimizing operating difficulties. In addition, by my invention it is possible to utilize grades of ore which would not be suitable for use in ordinary open hearth operation.

The terms and expressions which I have employed are used in a descriptive and not a limiting sense, and I have no intention of excluding such equivalents of the invention described, or of portions thereof, as fall within the purview of the claims.

I claim:

1. A method of preparing an ore charge for open hearth furnaces, comprising the steps of mixing iron ore, fuel, limestone, and ferrous metal chips, and sintering the mixture to form a slag in which a large percentage of the ore has been reduced to the ferrous oxide.

2. A method of preparing an ore charge for open hearth furnaces, comprising the steps of mixing iron ore, fuel and ferrous metal chips, and sintering the mixture to form a product in which a large percentage of the ore has been reduced to the ferrous oxide and which contains metallic iron.

3. A method of preparing an ore charge for open hearth furnaces, comprising the steps of mixing iron ore, fuel, limestone, and ferrous metal chips, and sintering the mixture to form a product in which a large percentage of the ore has been reduced to the ferrous oxide and which contains metallic iron.

4. A method of preparing an ore charge for furnaces used in the refining of ferrous metals, comprising the steps of mixing with iron ore and fuel a substantial amount of a calcareous mineral, and sintering the mixture, the proportions of the named ingredients being adjusted to form a product comprising from about 30 to 60 percent of ferrous oxide, and from about 5 to 15 percent of calcium silicate.

5. A method of preparing an ore charge for furnaces used in the refining of ferrous metals, comprising the steps of mixing iron ore, fuel, limestone, and ferrous metal fragments, and sintering the mixture, the proportions of the named ingredients being adjusted to form a product comprising from about 5 to 15 percent of free iron, from about 30 to 60 percent of ferrous oxide, and from about 5 to 15 percent of calcium silicate.

6. An ore charge for furnaces used in refining ferrous metals consisting of an agglomerate comprising from about 30 to 60 percent of ferrous oxide, and from about 5 to 15 percent of calcium silicate.

7. An ore charge for furnaces used in refining ferrous metals consisting of an agglomerate comprising iron oxide principally in the ferrous form, and calcium principally in the form of silicates and phosphates.

8. In the making of open hearth steel, the steps which comprise converting the silica and phosphorus of the ore charge into their calcium compounds before charging them into the open hearth, thereafter reacting the converted ore charge with free ferrous metal in the open hearth, and adjusting the carbon content of the bath by the addition of an agglomerate comprising iron ore sintered with ferrous metal chips.

9. In the making of open hearth steel, the step which comprises adding to the molten bath in the furnace a decarburizing agglomerate, said agglomerate comprising iron oxide principally in the ferrous form and free ferrous metal from turnings or borings.

10. In the making of steel, the steps which comprise mixing with iron ore and fuel a substantial amount of limestone, sintering the mixture to convert the silica of the ore into calcium silicate and reduce a large percentage of the ore to the ferrous oxide, and thereafter introducing the converted ore charge into a refining furnace and reacting said charge with free ferrous metal in said furnace.

JOHN E. GREENAWALT.